(12) United States Patent  (10) Patent No.: US 8,090,511 B2
Kuwahara  (45) Date of Patent: Jan. 3, 2012

(54) GEAR SHIFT SYSTEM FOR VEHICLE, CONTROL DEVICE AND CONTROL METHOD FOR AUTOMATIC TRANSMISSION

(75) Inventor: Seiji Kuwahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 275 days.

(21) Appl. No.: 12/216,426

(22) Filed: Jul. 3, 2008

(65) Prior Publication Data
US 2009/0018736 A1  Jan. 15, 2009

(30) Foreign Application Priority Data
Jul. 10, 2007  (JP) ................................. 2007-180574

(51) Int. Cl.
G06F 7/00  (2006.01)
(52) U.S. Cl. ................ 701/59; 701/51; 701/61; 701/62; 701/65; 701/80; 477/43; 477/48; 477/107; 477/110
(58) Field of Classification Search ..................... 701/51, 701/61, 62, 65, 87, 95; 477/43, 48, 107, 477/110
See application file for complete search history.

(56) References Cited

U.S. PATENT DOCUMENTS

| 5,716,301 | A | * | 2/1998 | Wild et al. ........................ 477/97 |
| 5,752,214 | A | | 5/1998 | Minowa et al. |
| 6,306,062 | B1 | | 10/2001 | Toukura et al. |
| 6,345,222 | B1 | * | 2/2002 | Toukura et al. ................. 701/53 |
| 2008/0319620 | A1 | | 12/2008 | Fakler et al. |

FOREIGN PATENT DOCUMENTS

| DE | 195 28 625 A1 | 2/1997 |
| DE | 102 48 401 A1 | 4/2004 |
| DE | 10 2005 040 179 A1 | 3/2007 |
| JP | 62-181927 | 8/1987 |
| JP | A-3-103660 | 4/1991 |
| JP | A-4-238746 | 8/1992 |
| JP | A-5-263904 | 10/1993 |
| JP | A-8-318765 | 12/1996 |
| JP | A-9-126307 | 5/1997 |
| JP | A-10-157491 | 6/1998 |
| JP | A-10-159959 | 6/1998 |
| JP | A-10-246325 | 9/1998 |
| JP | A-2000-255286 | 9/2000 |
| JP | A-2002-192988 | 7/2002 |

OTHER PUBLICATIONS

May 6, 2010 Office Action issued in German Patent Application No. 10 2008 040 299.0-14 (with translation).

* cited by examiner

Primary Examiner — Hussein Elchanti
Assistant Examiner — Redhwan K Mawari
(74) Attorney, Agent, or Firm — Oliff & Berridge, PLC

(57) ABSTRACT

A parameter having an accelerator pedal position and a drive force as components is set according to information representing driver's operations such as the accelerator pedal position and a stroke amount of a brake pedal. Similarly to the information representing the driver's operation, a parameter having the accelerator pedal position and the drive force as the components is set according to information representing running environment of a vehicle such as a gradient of a road surface, a curvature of the road surface, a friction coefficient μ of the road surface, a type of a road and a length of traffic jam. One parameter α(OUT) is set by mediating a parameter α(1) obtained from the information representing the driver's operation and a parameter α(2) obtained from the information representing the running environment of the vehicle. The gear corresponding to the parameter α(OUT) is set.

17 Claims, 10 Drawing Sheets

GEAR SHIFT SYSTEM FOR VEHICLE, CONTROL DEVICE AND CONTROL METHOD FOR AUTOMATIC TRANSMISSION

This nonprovisional application is based on Japanese Patent Application No. 2007-180574 filed with the Japan Patent Office on Jul. 10, 2007 the entire contents of which are hereby incorporated by reference.

BACKGROUND OF THE INVENTION

1. Field of the Invention

The present invention relates to a gear shift system for a vehicle as well as a control device and a control method for an automatic transmission, and particularly to a technique for controlling a gear ratio of an automatic transmission.

2. Description of the Background Art

A vehicle equipped with an automatic transmission has been known. In general, a gear ratio of the automatic transmission is determined according to an accelerator pedal position and a vehicle speed. For setting the gear ratio more finely, it is preferable to give consideration to running environment (a gradient of a road surface, a curvature of the road surface, a friction coefficient of the road surface, a degree of traffic jam and a type of the road) of the vehicle and the like as well as an accelerator pedal position and a vehicle speed.

Japanese Patent Laying-Open No. 9-126307 has disclosed a gear shift control device of an automatic transmission including a deceleration state determining unit determining a deceleration state of a vehicle, a deceleration gear setting unit for setting gears within gear selection ranges of different drive state parameters, respectively, based on the plurality of drive state parameters when deceleration determination is performed, and a gear shift control unit performing gear shift control by determining, as the gear, a lowest gear among the plurality of gears that are set by the deceleration gear setting unit.

According to the gear shift control device described in the above publication, the selection range of the gear for each parameter is different from those for the other parameters in the deceleration state. Therefore, such a structure is employed, e.g., that a second gear is selected for one parameter, but a third gear is selected as the lowest gear for another parameter. Thereby, it is possible to reduce the number of times that the second gear is finally selected, and the excessive engine braking can be avoided.

However, the gear shift control device disclosed in Japanese Patent Laying-Open No. 9-126307 finally selects the gear that is set based on one of the drive state parameters. Therefore, the gear may not be selected in view of mutual effects of the plurality of parameters. For example, the second gear may not be selected in the case where it is appropriate to select the third gear when consideration is given only to a road surface gradient, to select the third gear when consideration is given to only an accelerator pedal position and to select the second gear when consideration is given to both the road surface gradient and the accelerator pedal position. Further, the gear shift control device disclosed in Japanese Patent Laying-Open No. 9-126307 determines the gear according to a two-dimensional shift map using a vehicle speed, a throttle position and the like. Therefore, a parameter other than those used in the shift map cannot be reflected in the gear without difficulty. Therefore, there is a room for further improvement for setting more finely the gear, i.e., the gear ratio of the automatic transmission.

SUMMARY OF THE INVENTION

An object of the invention is to provide a gear shift system for a vehicle as well as a control device and a control method for an automatic transmission that can finely control a gear ratio of the automatic transmission.

A gear shift system for a vehicle according to an aspect comprises an automatic transmission and a control unit. The control unit detects first information representing a driver's operation, detects second information representing running environment of the vehicle, sets a first parameter having two or more components according to the first information, sets a second parameter having the same types of components as the first parameter according to the second information, sets a third parameter having the same types of components as the first and second parameters according to the first and second parameters, sets a gear ratio according to the third parameter, and controls the automatic transmission to shift the gear according to the set gear ratio.

This structure detects the first information representing the driver's operation and the second information representing the running environment of the vehicle. The first parameter having the two or more components is set according to the first information. The second parameter having the same types of components as the first parameter is set according to the second information. Thereby, the driver's operation and the running environment of the vehicle can be represented with the parameters that are unified to have the same types of components. According to the first and second parameters, the third parameter having the same types of components as the first and second parameters is set. Thereby, it is possible to obtain the third parameter that is determined in view of both the driver's operation and the running environment of the vehicle. The gear ratio is set according to the third parameter. The automatic transmission is controlled to shift the gear according to the gear ratio thus set. Thereby, the gear ratio can be set with consideration given to the mutual effects of the driver's operation and the running environment of the vehicle. Therefore, the gear ratio of the automatic transmission can be set more finely than the case where the gear ratio is set with consideration given to the driver's operation and the running environment of the vehicle independently of each other. Consequently, the gear ratio of the automatic transmission can be controlled finely.

Preferably, each of the components of the third parameter is a sum of the respective components of the first and second parameters.

This structure can obtain the third parameter by adding the components of the first parameter obtained from the first information representing the driver's operation and the second parameter obtained from the second information representing the running environment of the vehicle with respect to each type of the components.

Further preferably, each of the components of the third parameter is a maximum value of the respective components of the first and second parameters.

This structure can obtain the third parameter by collecting the maximum values of the respective components of the first parameter obtained from the first information representing the driver's operation and the second parameter obtained from the second information representing the running environment of the vehicle.

Further preferably, each of the components of the third parameter is a minimum value of the respective components of the first and second parameters.

This structure can obtain the third parameter by collecting the minimum values of the respective components of the first parameter obtained from the first information representing the driver's operation and the second parameter obtained from the second information representing the running environment of the vehicle.

Further preferably, the types of the components of the first, second and third parameters are an accelerator pedal position and a drive force.

This structure can set the parameters having the accelerator pedal position and the drive force as the components according to the driver's operation and the running environment of the vehicle.

A gear shift system for a vehicle according to another aspect of the invention comprises an automatic transmission and a control unit. The control unit detects a vehicle speed, detects an accelerator pedal position, detects a drive force of the vehicle and controls the automatic transmission to shift a gear according to a map determining a gear ratio based on the vehicle speed, the accelerator pedal position and the drive force.

This structure controls the automatic transmission to shift the gear according to the map determining the gear ratio based on the vehicle speed, the accelerator pedal position and the drive force. Thereby, the gear ratio can be set with consideration given to the three components, i.e., the vehicle speed, the accelerator pedal position and the drive force. Therefore, the gear ratio can be set more finely than the case where the gear ratio is set according to a two-dimensional map using the vehicle speed and the accelerator pedal position. Consequently, the gear ratio of the automatic transmission can be controlled finely.

Preferably, the control unit estimates a future drive force, and controls the automatic transmission to attain a gear ratio determined using the future drive force, when the gear ratio determined using the current drive force is smaller than the gear ratio determined using the future drive force.

This structure estimates the future drive force. When the gear ratio determined using the current drive force is smaller than the gear ratio determined using the future drive force, the automatic transmission is controlled to attain the gear ratio determined using the future drive force. Thereby, when it is expected that a large gear ratio will be required in the future, the state in which the gear ratio is large can be maintained. Thereby, it is possible to reduce the number of times of unnecessary gear shifting. Also, the'acceleration response can be improved.

A gear shift system for a vehicle according to yet another aspect comprises an automatic transmission and a control unit. The control unit detects a vehicle speed, detects a throttle position, detects a drive force of the vehicle and controls the automatic transmission to shift a gear change according to a map determining a gear ratio based on the vehicle speed, the throttle position and the drive force.

This structure controls the automatic transmission to shift the gear change according to the map determining the gear ratio based on the vehicle speed, the throttle position and the drive force. Thereby, the gear ratio can be set with consideration given to the three components, i.e., the vehicle speed, the throttle accelerator pedal position and the drive force. Therefore, the gear ratio can be set more finely than the case where the gear ratio is set according to the two-dimensional map using the vehicle speed, the throttle position and the like. Consequently, the gear ratio of the automatic transmission can be controlled finely.

Preferably, the control unit estimates a future drive force, and controls the automatic transmission to attain a gear ratio determined using the future drive force, when the gear ratio determined using the current drive force is smaller than the gear ratio determined using the future drive force.

This structure estimates the future drive force. When the gear ratio determined using the current drive force is smaller than the gear ratio determined using the future drive force, the automatic transmission is controlled to attain the gear ratio determined using the future drive force. Thereby, when it is expected that a large gear ratio will be required in the future, the state in which the gear ratio is large can be maintained. Thereby, it is possible to reduce the number of times of unnecessary gear shifting. Also, the acceleration response can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
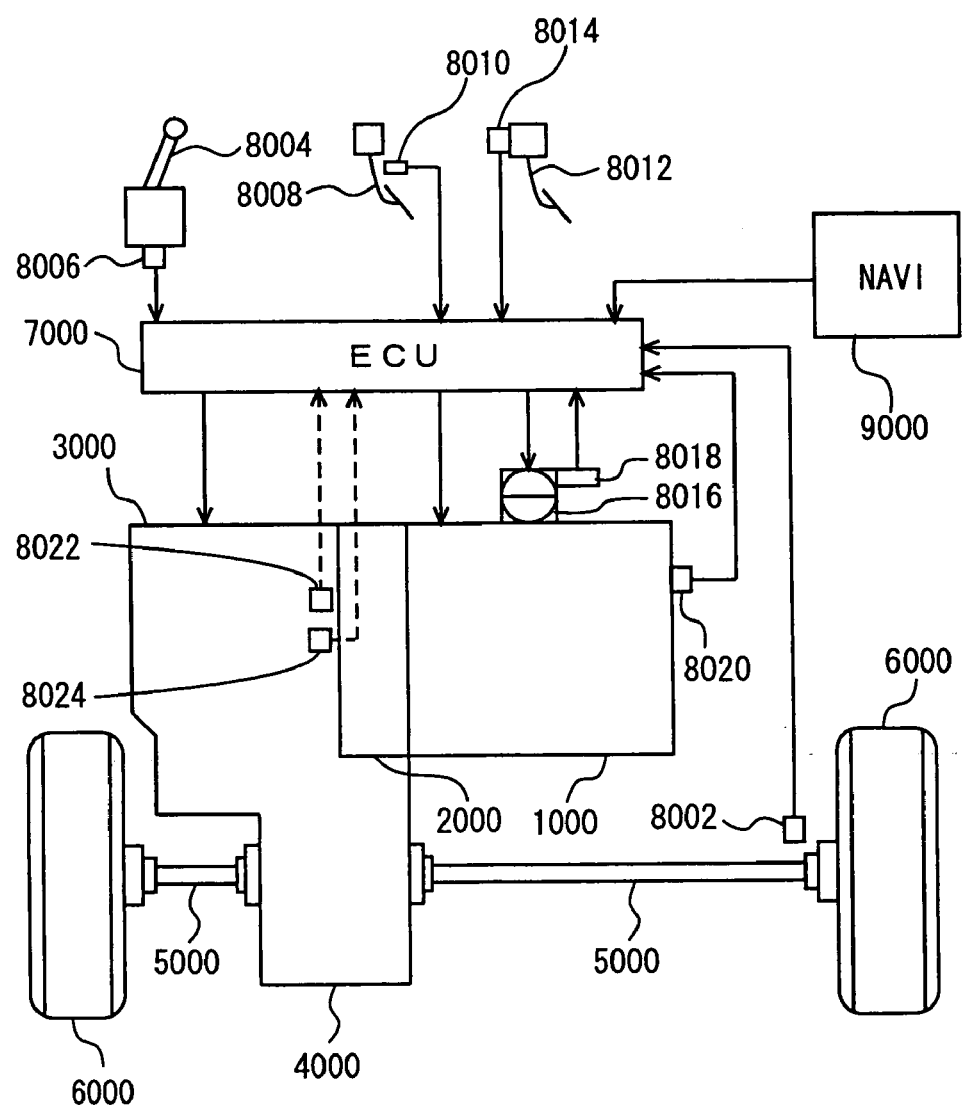
FIG. 1 is a schematic view showing a structure of a vehicle.

A vehicle equipped with a control device according to the first embodiment of the present invention will be described with reference to FIG. 1. The vehicle is an FF (Front engine Front drive) vehicle. It is noted that the vehicle may be a vehicle such as a FR (Front engine Rear drive) vehicle other than the FF vehicle.

The vehicle includes an engine 1000, a torque converter 2000, an automatic transmission 3000, a differential gear 4000, a drive shaft 5000, front wheels 6000 and an ECU (Electronic Control Unit) 7000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An amount of fuel injected from the injector is determined in accordance with an amount of air taken into engine 100 such that a desired air-fuel ratio (for example, stoichiometric air-fuel ratio) is attained.

Automatic transmission 3000 is coupled to engine 1000 with torque converter 2000 being interposed. Therefore, an output shaft revolution speed of torque converter 2000 (a turbine speed NT) is equal to an input shaft revolution speed of automatic transmission 3000.

Automatic transmission 3000 is an automatic transmission having a planetary gear unit. Automatic transmission 3000 converts the revolution speed of the crankshaft to a desired revolution speed for speed change by implementing a desired gear. Instead of the automatic transmission implementing the gear, a CVT (Continuously Variable Transmission) that continuously varies a gear ratio may be mounted. Alternatively, an automatic transmission including constant mesh gears shifted by means of a hydraulic actuator may be mounted.

An output gear of automatic transmission 3000 meshes with differential gear 4000. Drive shaft 5000 is coupled to differential gear 4000 by spline-fitting or the like. A motive power is transmitted to left and right front wheels 6000 via drive shaft 5000.

Wheel speed sensors 8002, a position sensor 8006 of a shift lever 8004, an accelerator pedal position sensor 8010 of an accelerator pedal 8008, a stroke sensor 8014 of a brake pedal 8012, a throttle position sensor 8018 of an electronic throttle valve 8016, an engine speed sensor 8020, an input shaft speed sensor 8022 and an output shaft speed sensor 8024 are connected to ECU 7000 via a harness and the like. Further, a navigation system 9000 is connected to ECU 7000 via a harness and the like.

Wheel speed sensors 8002 detect the wheel speeds of the four wheels of the vehicle, respectively, and transmit signals representing the detected results to ECU 7000. ECU 7000 calculates a friction coefficient $\mu$ of a road surface according to a map using a speed difference between the wheels and others. The friction coefficient $\mu$ of the road surface can be calculated in a manner utilizing a well-known technology, and therefore description thereof is not repeated.

The position of shift lever 8004 is detected by position sensor 8006, and a signal representing the detected result is transmitted to ECU 7000. A gear of automatic transmission 3000 is automatically implemented corresponding to the position of shift lever 8004. Additionally, such a configuration may be employed that the driver can select a manual shift mode for arbitrarily selecting a gear according to the driver's operation.

Accelerator pedal position sensor 8010 detects the position (press-down degree) of accelerator pedal 8008 operated by the driver, and transmits a signal representing the detected result to ECU 7000. Stroke sensor 8014 detects the stroke amount of brake pedal 8012 operated by the driver, and transmits a signal representing the detected result to ECU 7000.

Throttle position sensor 8018 detects the position (degree of throttle opening) of electronic throttle valve 8016 of which position is adjusted by the actuator, and transmits a signal representing the detected result to ECU 7000. Electronic throttle valve 8016 regulates the amount of air (output of engine 1000) taken into engine 1000. The amount of air taken into engine 1000 increases with the degree of throttle opening. Thus, the throttle position or the degree of throttle opening can be used as a value representing the output of engine 1000. The amount of air may be regulated in accordance with a lift amount or an angle of action of an intake valve (not shown) provided in the cylinder. Here, the amount of air increases with the lift amount and/or the angle of action.

Engine speed sensor 8020 detects a speed (engine revolution speed NE) of the output shaft (crankshaft) of engine 1000, and transmits a signal representing the detected result to ECU 7000. Input shaft speed sensor 8022 detects an input shaft revolution speed NI (turbine speed NT) of automatic transmission 3000, and transmits a signal representing the detected result to ECU 7000.

Output shaft speed sensor 8024 detects an output shaft revolution speed NO of automatic transmission 3000, and transmits a signal representing the detected result to ECU 7000. ECU 7000 detects the vehicle speed based on output shaft revolution speed NO, a radius of the wheel and the like. The vehicle speed can be detected in a manner utilizing a well-known technology, and therefore description thereof is not repeated.

Navigation system 9000 detects the position of the vehicle by a GPS (Global Positioning System). Also, navigation system 9000 stores information representing a part of running environment of the vehicle such as gradients of road surfaces, curvatures of road surfaces, types of roads (freeways or general roads) and the like. To ECU 7000, navigation system 9000 transmits the information representing the surface gradient, surface curvature and type of the road on which the vehicle is currently running.

Navigation system 9000 receives VICS (Vehicle Information and Communication System) information representing a part of the current running environment of the vehicle. As the VICS information, navigation system 9000 receives a length (or degree) of traffic jam and others. Navigation system 9000 transfers the received VICS information to ECU 7000.

ECU 7000 controls equipment such that the vehicle is in a desired running state, based on signals sent from the foregoing sensors and the like as well as a map stored in an ROM (Read Only Memory), a program stored therein and the information transmitted from navigation system 9000. ECU 7000 may be formed of a plurality of divided ECUs.

In the present embodiment, when shift lever 8004 is in a D (drive) position and thereby a D (drive) range is selected as the shift range in automatic transmission 3000, ECU 7000 controls automatic transmission 3000 to implement one of the first to sixth gears. Since one of the first to sixth gears is implemented, automatic transmission 3000 can transmit a drive force to front wheels 6000. It is noted that the number of gears to be implemented is not limited to six, and may be seven or eight.

Figure 2:
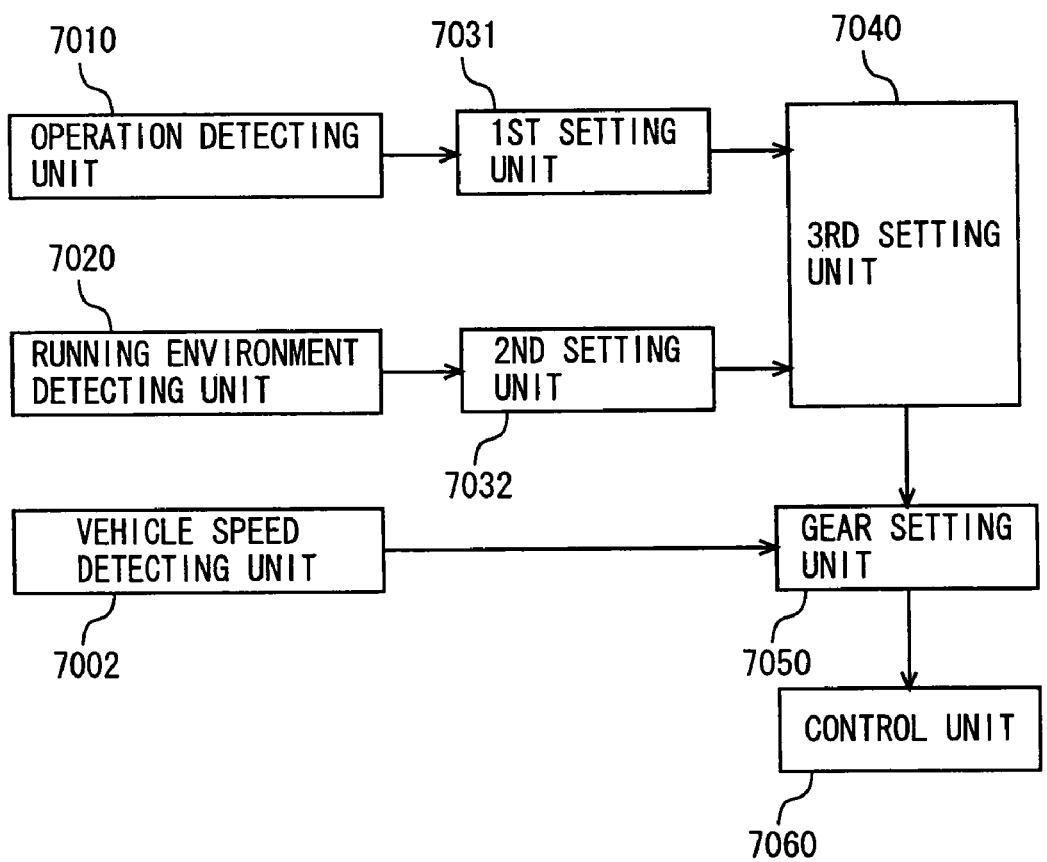
FIG. 2 is a functional block diagram of an ECU in a first embodiment of the invention.

Referring to FIG. 2, the function of ECU 7000 will be described below. The following function of ECU 7000 may be implemented by either hardware or software.

ECU 7000 includes a vehicle speed detecting unit 7002, an operation detecting unit 7010, a running environment detecting unit 7020, a first setting unit 7031, a second setting unit 7032, a third setting unit 7040, a gear setting unit 7050 and a control unit 7060.

Vehicle speed detecting unit 7002 detects the vehicle speed based on output shaft revolution speed NO of automatic transmission 3000 detected by output shaft speed sensor 8024.

Operation detecting unit 7010 detects information representing the operation of the driver. More specifically, it detects the accelerator pedal position based on the signal provided from accelerator pedal position sensor 8010. Also, operation detecting unit 7010 detects the stroke amount of brake pedal 8012 based on the signal transmitted from stroke sensor 8014. The information representing the driver's operation is not restricted to the above.

Running environment detecting unit 7020 detects the information representing the running environment of the vehicle. More specifically, running environment detecting unit 7020 detects the road surface gradient, the road surface curvature, the road type and the length (degree) of traffic jam based on the signals transmitted from navigation system 9000. Further, running environment detecting unit 7020 calculates friction coefficient μ of the road surface based on the signal transmitted from wheel speed sensors 8002. The information representing the running environment of the vehicle is not restricted to the above.

Figure 3:
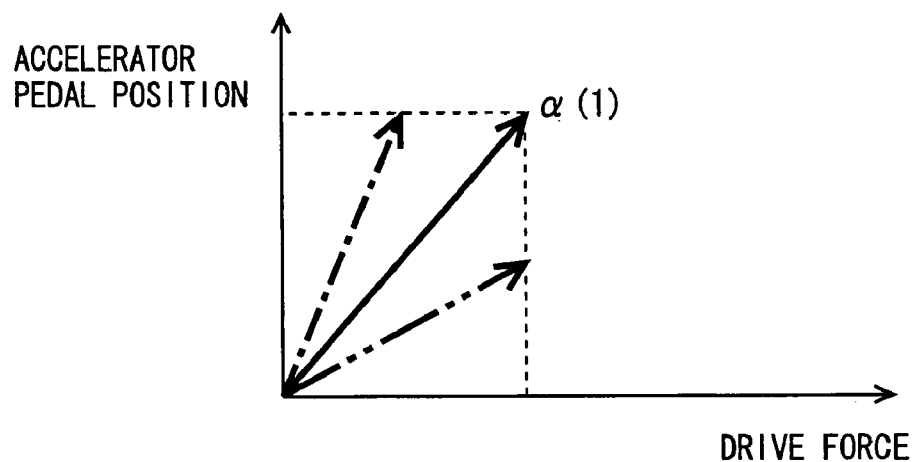
FIG. 3 is a diagram (first) illustrating a manner of mediating parameters.

First setting unit 7031 sets a parameter that has the accelerator pedal position and the drive force as components, according to the information representing the driver's operation. More specifically, first setting unit 7031 detects the drive force (target drive force) of the vehicle from the accelerator pedal position according to the map that is prepared in advance. The accelerator pedal position thus detected is used as it is. Thereby, the parameter (vector) according to the detected accelerator pedal position is set as represented by alternate long and short dash line in FIG. 3.

Also, the parameter that has the accelerator pedal position and the drive force according to the stroke amount of brake pedal 8012 as the components is set according to the predetermined map as represented by alternate long and two short dashes line. It is noted that the detected accelerator pedal position may be used as it is.

First setting unit 7031 provides a parameter α(1) obtained by mediating the two parameters obtained from the accelerator pedal position and the stroke amount. For example, it outputs a parameter prepared by collecting the maximum values of respective components of the two parameters as represented by solid line in FIG. 3. The manner of mediating the parameters is not restricted to the above.

Second setting unit 7032 sets the parameter that has the accelerator pedal position and the drive force as components, according to the information representing the environment in which the vehicle runs. More specifically, second setting unit 7032 sets the parameter (vector) that has the accelerator pedal position and the drive force corresponding to each of the road surface gradient, the road surface curvature, the road type, the length of traffic jam and friction coefficient μ of the road surface, according to the map that is prepared in advance. Second setting unit 7032 outputs a parameter α(2) obtained by mediating these parameters. For example, it outputs the parameter obtained by collecting the maximum values of the respective components of the plurality of obtained parameters.

The detected accelerator pedal position may be used as it is. Also, consideration may be given to the drive force that is required from the vehicle side for the control such as VSC (Vehicle Stability Control) and/or TRC (TRaction Control) that are performed for stabilizing behaviors of the vehicle by controlling the drive force of the vehicle.

Figure 4:
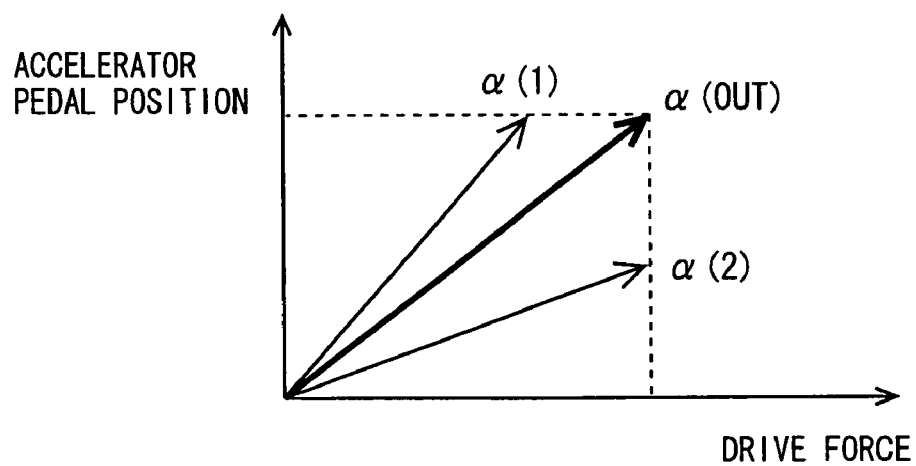
FIG. 4 shows a parameter α(OUT).

Third setting unit 7040 sets one parameter α(OUT) obtaining by mediating parameters α(1) and α(2) provided from first and second setting units 7031 and 7032, respectively. For example, as shown in FIG. 4, third setting unit 7040 sets parameter α(OUT) by collecting the maximum values of the respective components of parameters α(1) and α(2). The manner of mediating the parameters is not restricted to the above.

Figure 5:
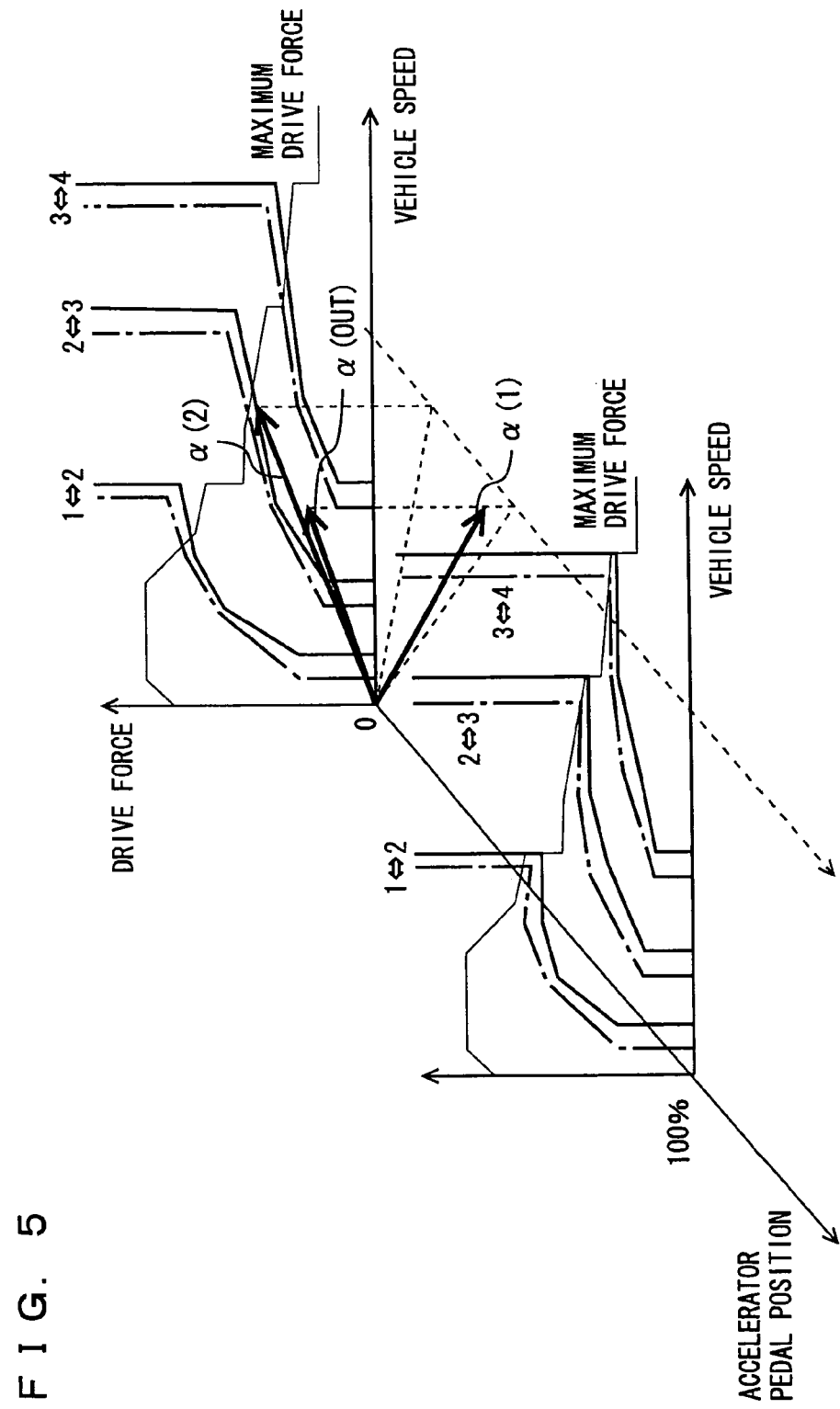
FIG. 5 is a diagram (first) showing a shift map.

Gear setting unit 7050 sets the gear, i.e., the gear ratio corresponding to parameter α(OUT) set by third setting unit 7040. As shown in FIG. 5, the gear is set according to a shift map using the accelerator pedal position, the drive force and the vehicle speed. A gear shift line represented by a solid line in FIG. 5 is an up-shift line. A gear shift line represented by an alternate long and short dash line in FIG. 5 is a down-shift line.

The shift map is determined for each type of vehicle. Therefore, changing only the shift map can change the gear shift characteristics. The gear shift line defined in the shift map continuously changes according to changes in accelerator pedal position. The gear shift lines may be set at intervals that are predetermined in the direction of change of the accelerator pedal position, and a gear shift line at an accelerator pedal position between these lines may be obtained by linear interpolation.

Control unit 7060 controls automatic transmission 3000 to shift the gear according to the set gear. More specifically, automatic transmission 3000 is controlled to implement the gear that is set by gear setting unit 7050.

Figure 6:
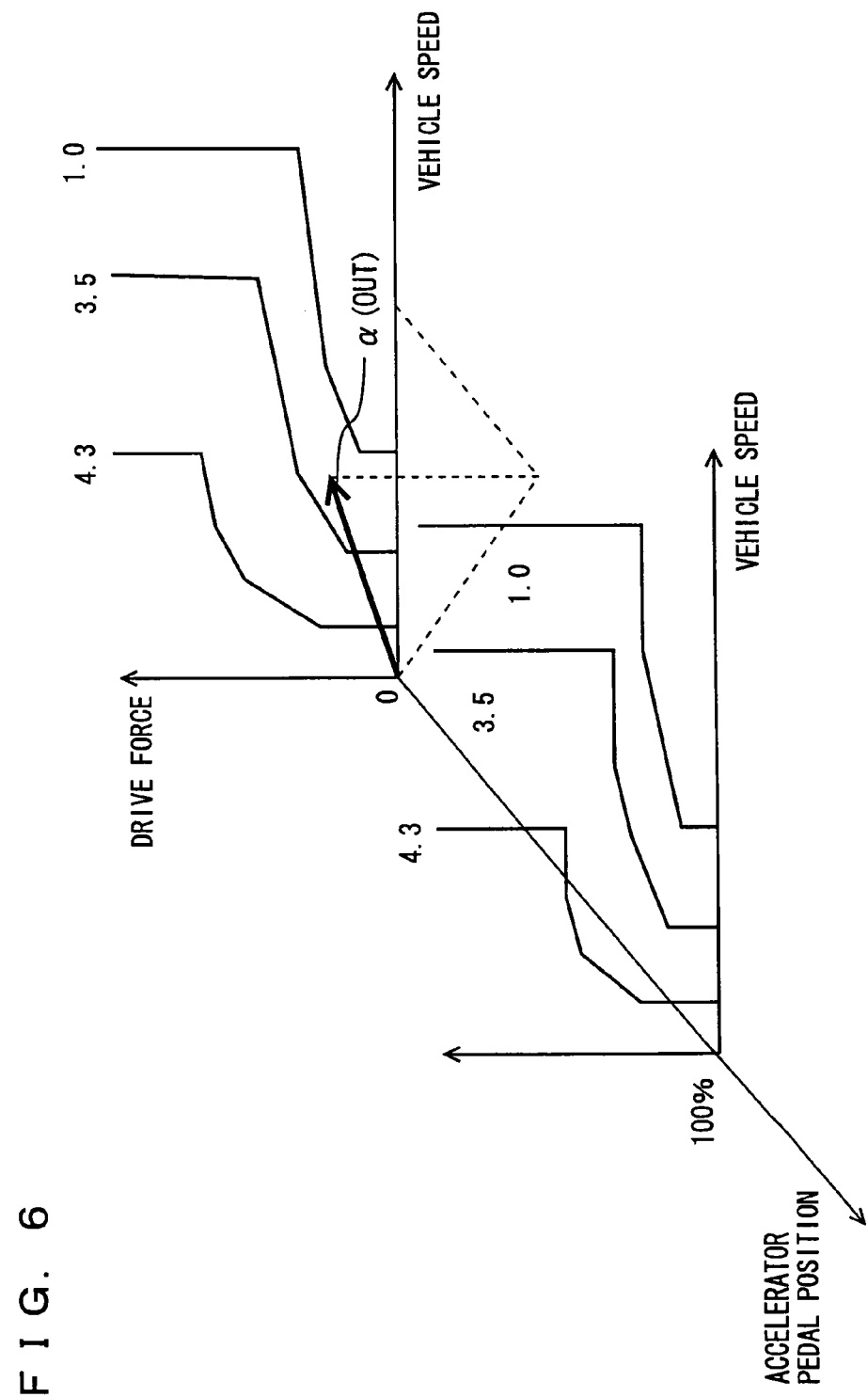
FIG. 6 is a diagram (second) showing a shift map.

When automatic transmission 3000 is a CVT, the gear ratio may be set according to the gear shift line as shown in FIG. 6 instead of setting the gear according to the gear shift line.

Figure 7:
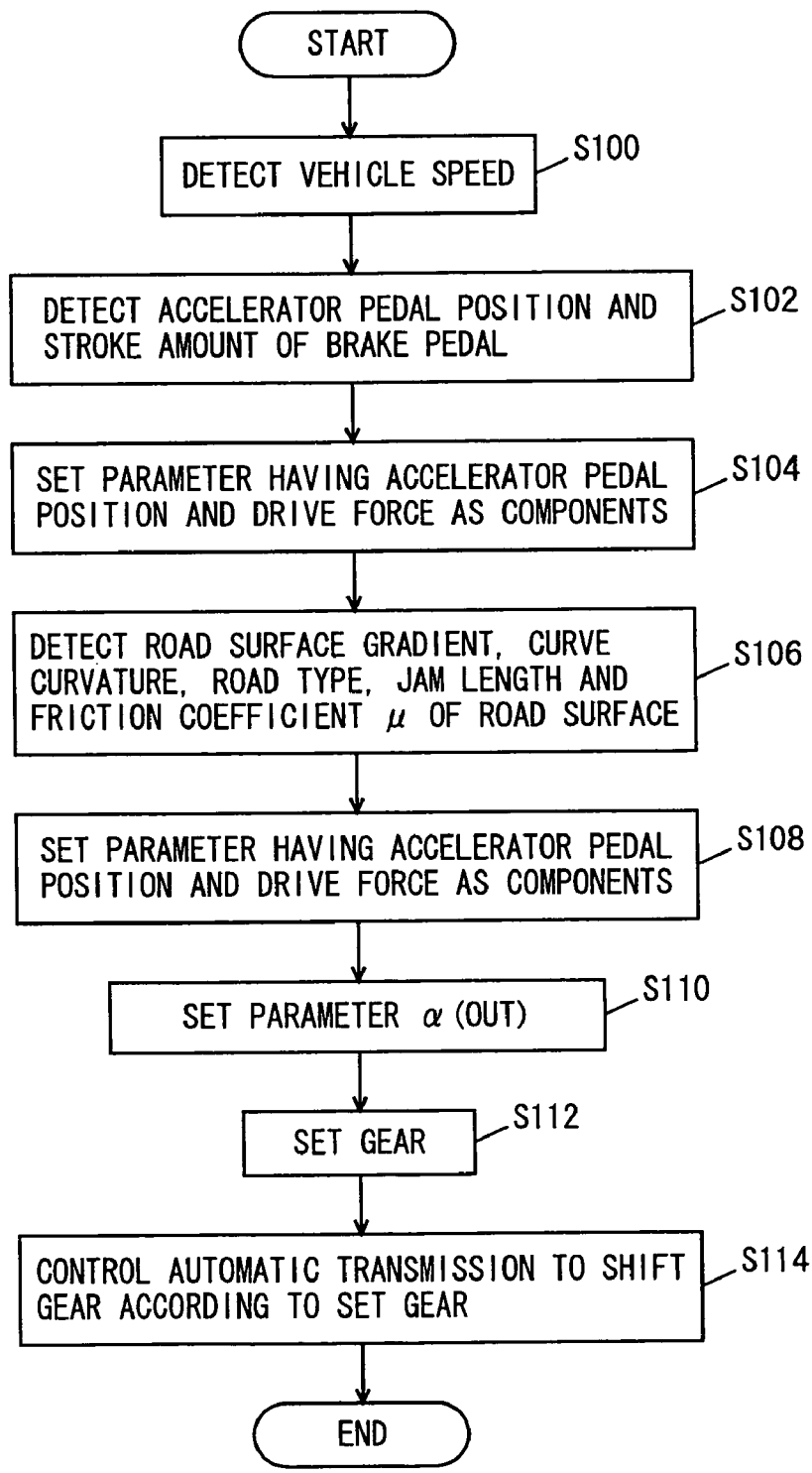
FIG. 7 is a flowchart showing a control structure of a program executed by the ECU in the first embodiment of the invention.

Referring to FIG. 7, description will now be given on the control structure of the program executed by ECU 7000 that is the control device according to the embodiment. Execution of the program described below is repeated at predetermined cycles. The program to be executed by ECU 7000 may be stored on CDs (Compact Discs), DVDs (Digital Versatile Discs) and the like for distribution on the market.

In step (which will be abbreviated as "S" hereinafter) 100, ECU 7000 detects the vehicle speed based on output shaft revolution speed NO of automatic transmission 3000 that is detected by output shaft speed sensor 8024.

In S102, ECU 7000 detects the information representing the driver's operation. Thus, it detects the accelerator pedal position based on the signal transmitted from accelerator pedal position sensor 8010. Further, it detects the stroke amount of brake pedal 8012 based on the signal transmitted from stroke sensor 8014. In S104, ECU 7000 sets the parameter having the accelerator pedal position and the drive force according to the information representing the driver's operation.

In S106, ECU 7000 detects the information representing the running environment of the vehicle. More specifically, it detects the road surface gradient, the road surface curvature, the road type and the length (degree) of traffic jam based on the signals transmitted from navigation system 9000. Also, ECU 7000 detects friction coefficient μ of the road surface based on the signal transmitted from wheel speed sensor 8002. In S108, ECU 7000 sets the parameter having the accelerator pedal position and the drive force as components according to the information representing the running environment of the vehicle.

In S110, ECU 7000 sets one parameter α(OUT) by mediating parameter α(1) obtained from the information representing the driver's operation and parameter α(2) obtained from the information representing the running environment of the vehicle.

In S112, ECU 7000 sets the gear according to parameter α(OUT) thus set according to the shift map. In S114, ECU 7000 controls automatic transmission 3000 to shift the gear according to the gear thus set.

Description will now be given on the operation of ECU 7000 based on the foregoing structure and the flowchart.

During the running of the vehicle, the vehicle speed is detected (S100). Further, the information representing the driver's operation, i.e., the accelerator pedal position and the stroke amount of brake pedal 8012 are detected (S102). According to the information representing the driver's operation, the parameter having the accelerator pedal position and the drive force as components is set (S104).

In addition to the information representing the driver's operation, the information representing the running environment of the vehicle, i.e., the road surface gradient, the road surface curvature, friction coefficient μ of the road surface, the road type, the length (degree) of traffic jam are detected (S106). Similarly to the information representing the driver's operation, the parameter having the accelerator pedal position and the drive force as components is set according to the information representing the running environment of the vehicle (S 108). Thereby, the driver's operation and the running environment of the vehicle can be represented with unified parameters having the same kinds of components.

One parameter α(OUT) is set by mediating parameter α(1) obtained from the information representing the driver's operation and parameter α(2) obtained from the information representing the running environment of the vehicle (S110). Thereby, parameter α(OUT) that is determined in view of both the driver's operation and the running environment of the vehicle.

The gear corresponding to parameter α(OUT) is set according to the shift map (S112). Automatic transmission 3000 is controlled to shift the gear according to the gear thus set (S114). Thereby, the gear can be set in view of the mutual effects of both the driver's operation and the running environment of the vehicle. Therefore, the gear of automatic transmission 3000 can be set more finely than the case where the gear ratio is set with consideration given to the driver's operation and the running environment of the vehicle independently of each other.

Figure 8:
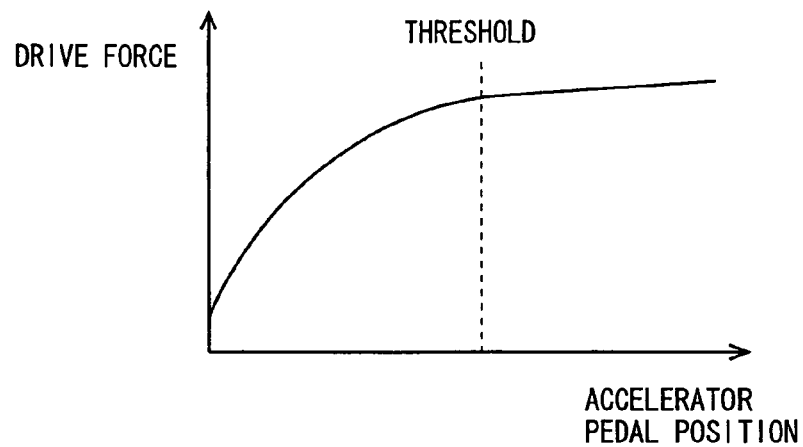
FIG. 8 shows a relationship between a drive force and an accelerator pedal position.

In this embodiment, the gear is set according to the three-dimensional shift map using the accelerator pedal position and the drive force in addition to the vehicle speed. As shown in FIG. 8, a rate of change of the drive force is large in a region where the accelerator pedal position is smaller than the threshold. Conversely, the rate of change of the drive force is small in a region where the accelerator pedal position is larger than the threshold. Therefore, such setting can be implemented that the gear is set primarily according to the drive force in the region where the accelerator pedal position is smaller than the threshold, and the gear is set primarily according to the accelerator pedal position in the region where the accelerator pedal position is larger than the drive force.

According to the control device of the embodiment, as described above, the parameter having the accelerator pedal position and the drive force as the components is set according to the information representing the driver's operation. The parameter having the accelerator pedal position and the drive force as the components is set according to the information representing the running environment of the vehicle. One parameter α(OUT) is set by mediating parameter α(1) obtained from the information representing the driver's operation and parameter α(2) obtained from the information representing the running environment of the vehicle. Thereby, parameter α(OUT) determined in view of both the driver's operation and the running environment of the vehicle can be obtained. The gear according to this parameter α(OUT) is set according to the shift map. The automatic transmission is controlled to shift the gear according to the set gear. Thereby, the gear can be set in view of the mutual effects of the driver's operation and the running environment of the vehicle. Therefore, the gears of the automatic transmission can be set more finely than the case where the gear ratio is set with consideration given to the driver's operation and the running environment of the vehicle independently of each other.

The parameter having the components other than the accelerator pedal position and the drive force may be set in addition to them.

Figure 9:
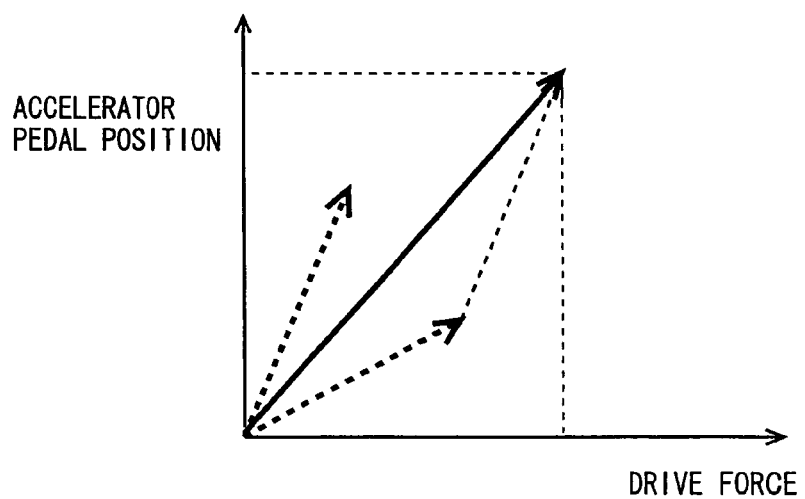
FIG. 9 is a diagram (second) showing the manner of mediating the parameters.
Figure 10:
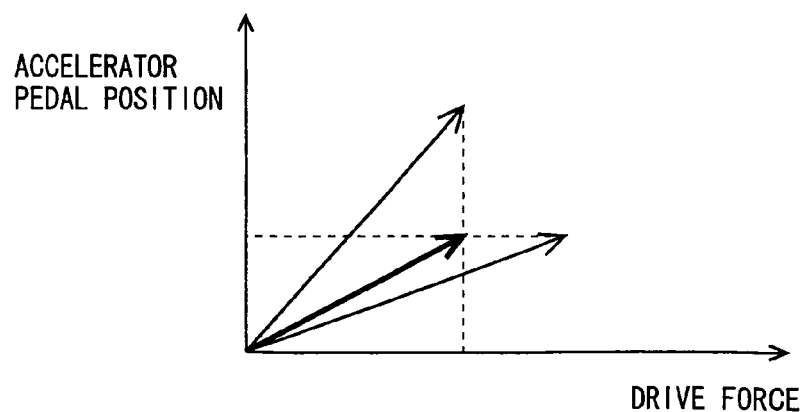
FIG. 10 is a diagram (third) showing the manner of mediating the parameters.

Instead of the manner of mediating the plurality of parameters by collecting the maximum values of the respective components of the parameters, the parameters may be mediated by adding each type of components of the plurality of parameters independently of the other types, as represented by solid line in FIG. 9. Thus, the parameters may be mediated by adding the vectors. Further, as shown in FIG. 10, the mediation of the parameters may be performed by collecting the minimum values of the respective components of the plurality of parameters. Further, the parameters may be represented as coordinates.

Further, the throttle position may be used instead of the accelerator pedal position because the accelerator pedal position is substantially proportional to the throttle position.

Second Embodiment

A second embodiment of the invention will now be described. This embodiment differs from the foregoing first embodiment in that the gear is set using a future accelerator pedal position and a future drive force in addition to the gear that is set using the current accelerator pedal position and the current drive force. The second embodiment also differs from the foregoing first embodiment in that the gear that is set using the future drive force is implemented when the gear ratio of the gear that is set using the current drive force is smaller than the gear ratio of the gear that is set using the future drive force. Structures other than the above as well as the functions thereof are the same as those of the foregoing first embodiment. Therefore, description thereof is not repeated.

Figure 11:
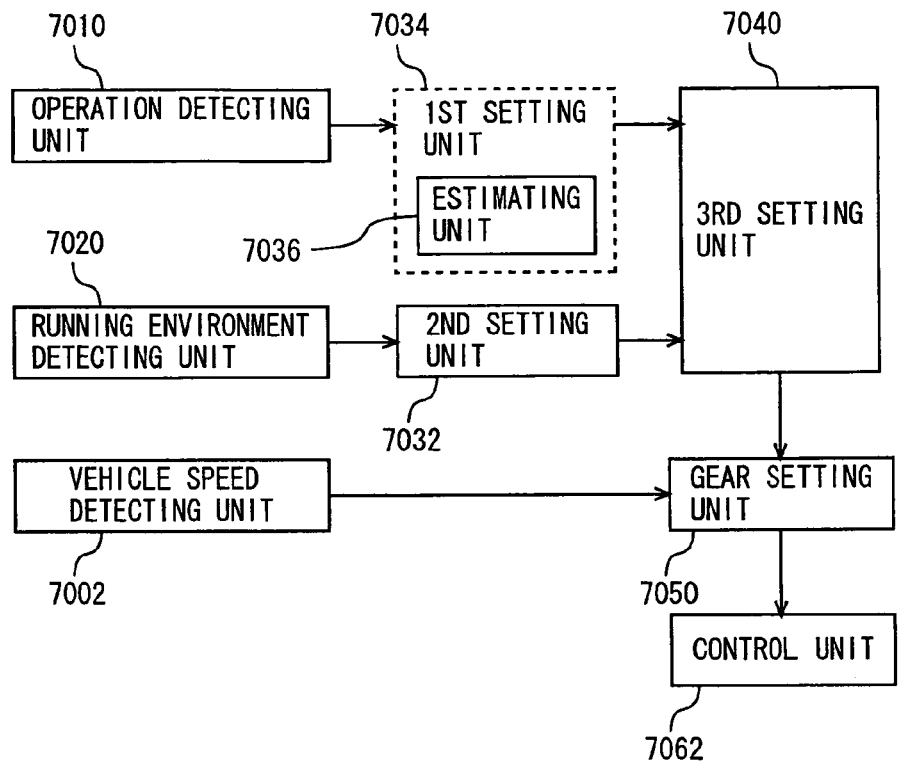
FIG. 11 is a functional block diagram of an ECU in a second embodiment of the invention.

Referring to FIG. 11, the functions of ECU 7000 will be described below. The same functions as those in the first embodiment bear the same numbers. Accordingly, description thereof is not repeated.

A first setting unit 7034 of ECU 7000 includes an estimating unit 7036. Estimating unit 7036 estimates the future drive force. More specifically, the accelerator pedal position that is detected when the rate of change of the accelerator pedal position is larger than a threshold is held for a predetermined time. The drive force (target drive force) is calculated from the accelerator pedal position thus held according to a predetermined map. The drive force that is calculated using the held accelerator pedal position is used as the future drive force. Therefore, the held accelerator pedal position is used as the future accelerator pedal position.

When the rate of change of the accelerator pedal position is larger than the threshold, it can be considered that the accelerator pedal position temporarily changes and will return to the accelerator pedal position attained before this temporary change. Therefore, the accelerator pedal position that is detected when the rate of change of the accelerator pedal position is larger than the threshold is used as the future accelerator pedal position. The manner of estimating the future drive force is not restricted to the above.

Figure 12:
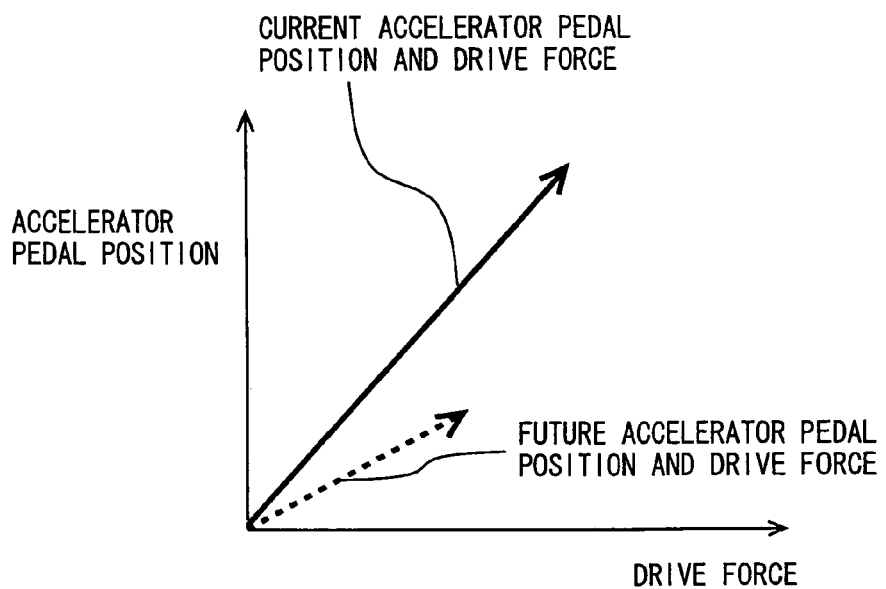
FIG. 12 shows a parameter using a current accelerator pedal position and a current drive force as well as a parameter using a future accelerator pedal position and a future drive force.

First setting unit 7034 sets the parameter according to the current accelerator pedal position, and further sets the parameter according to the future accelerator pedal position and the future drive force as shown in FIG. 12.

Therefore, this embodiment sets the two parameters α(OUT), i.e., parameter α(OUT) that is set using the current accelerator pedal position and the current drive force as well as parameter α(OUT) that is set using the future accelerator pedal position and the future drive force.

Consequently, this embodiment sets the two gears, i.e., the gear that is set using the current accelerator pedal position and the current drive force as well as the gear that is set using the future accelerator pedal position and the future drive force.

A control unit 7062 controls automatic transmission 3000 to implement the gear that is set using the future accelerator pedal position and the future drive force when the gear ratio of the gear that is set using the current accelerator pedal position and the current drive force is smaller than the gear ratio of the gear that is set using the future accelerator pedal position and the future drive force.

Control unit 7062 controls automatic transmission 3000 to implement the gear that is set using the current accelerator pedal position and the current drive force when the gear ratio of the gear that is set using the current accelerator pedal position and the current drive force is equal to or larger than the gear ratio of the gear that is set using the future accelerator pedal position and the future drive force.

Figure 13:
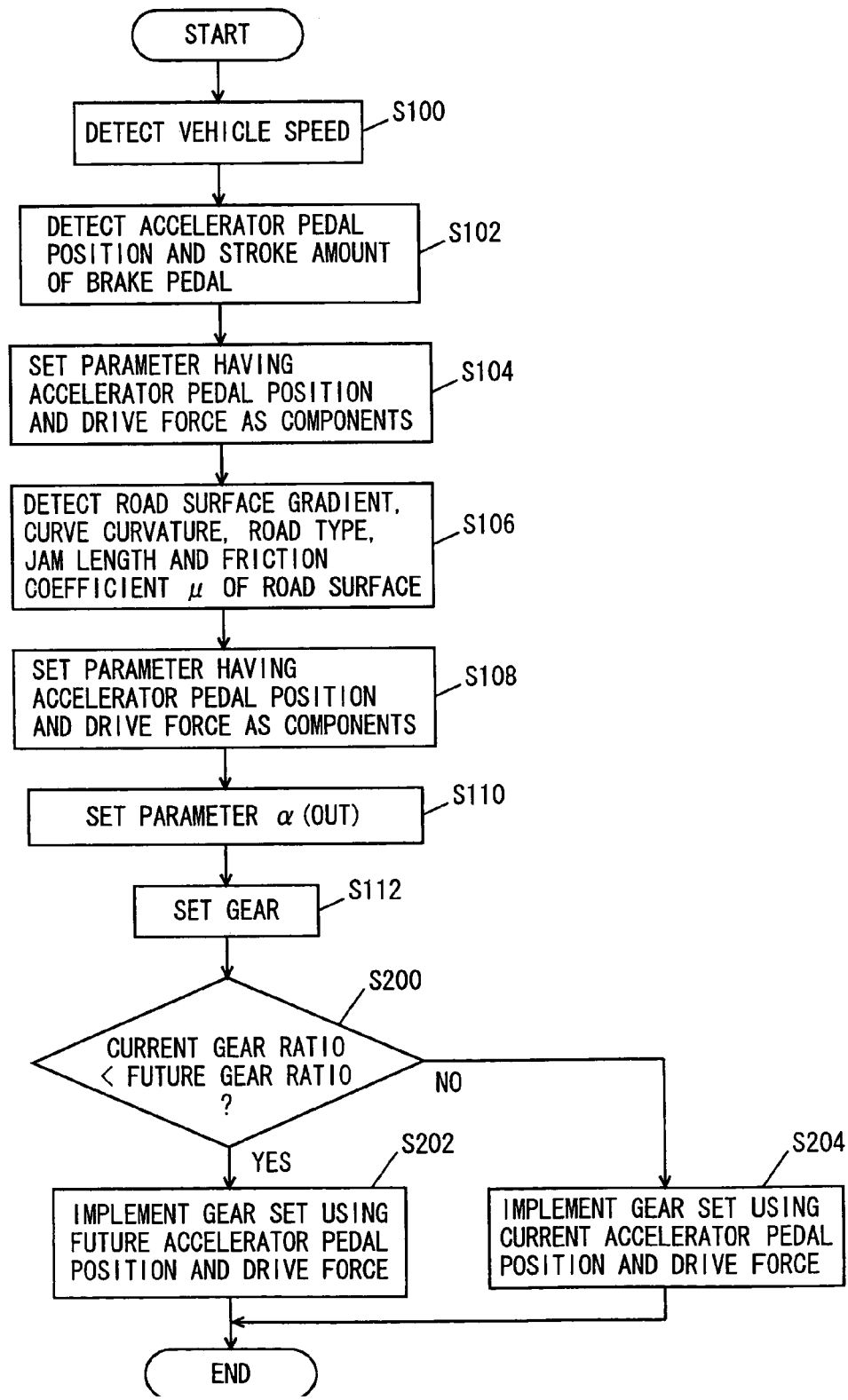
FIG. 13 is a flowchart showing a control structure of a program executed by the ECU in the second embodiment of the invention.

Referring to FIG. 13, description will now be given on the control structure of the program executed by ECU 7000, i.e., the control device according to this embodiment. Execution of the program described below is repeated at predetermined cycles. The same processing as that of the first embodiment already described bear the same step number. Therefore, description thereof is not repeated.

In S200, ECU 7000 determines whether the gear ratio of the gear that is set using the current accelerator pedal position and the current drive force is smaller than the gear ratio of the gear that is set using the future accelerator pedal position and the future drive force or not. When the gear ratio of the gear that is set using the current accelerator pedal position and the current drive force is smaller than the gear ratio of the gear that is set using the future accelerator pedal position and the future drive force (YES in S200), the process proceeds to S202. Otherwise (NO in S200), the process proceeds to S204.

In S202, ECU 7000 controls automatic transmission 3000 to implement the gear that is set using the future accelerator pedal position and the future drive force. In S204, ECU 7000 controls automatic transmission 3000 to implement the gear that is set using the current accelerator pedal position and the current drive force.

Description will now be given on the operation of ECU 7000 based on the foregoing structure and flowchart.

Figure 14:
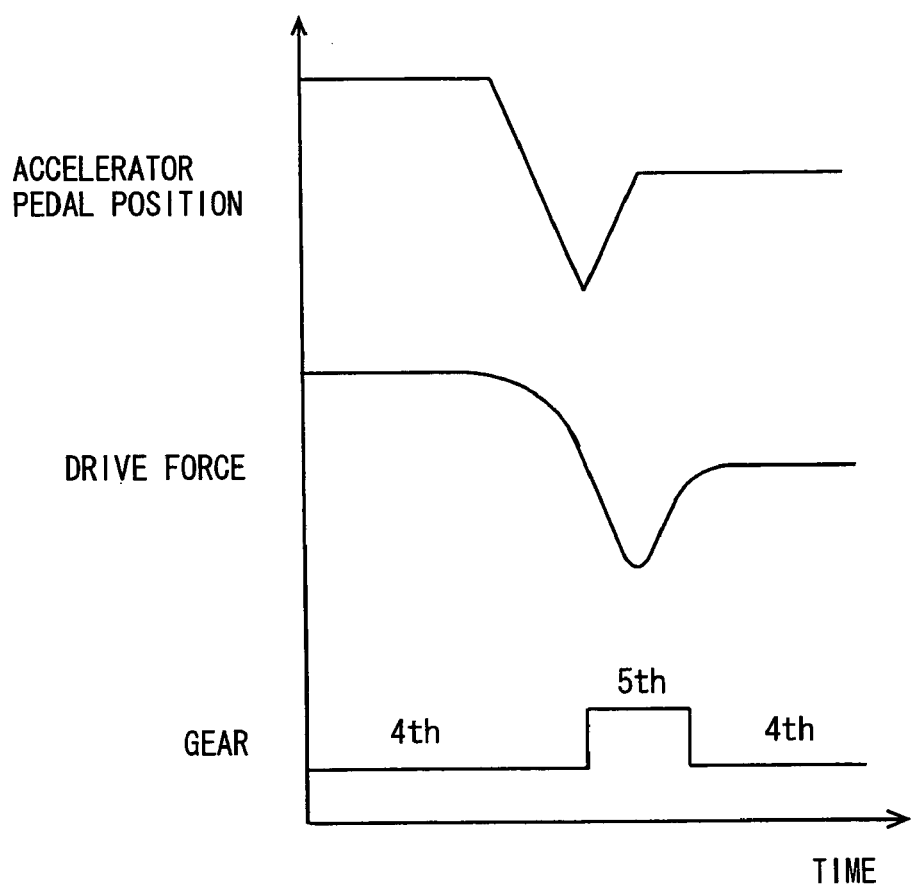
FIG. 14 is a timing chart showing changes of the accelerator pedal position, the drive force and the gear.

The gear ratio of the gear that is set using the current accelerator pedal position and the current drive force is smaller than the gear ratio of the gear that is set using the future accelerator pedal position and the future drive force (YES in S200), down-shift must be performed immediately after up-shift as shown in FIG. 14. Therefore, unnecessary up-shift may be performed.

When the gear ratio of the gear that is set using the current accelerator pedal position and the current drive force is smaller than the gear ratio of the gear that is set using the future accelerator pedal position and the future drive force (YES in S200), automatic transmission 3000 is controlled to implement the gear that is set using the future accelerator pedal position and the future drive force (S2020).

Thereby, when it is expected that a large gear ratio will be required in the future, the state in which the gear ratio is large can be maintained. Thereby, it is possible to reduce the number of times of unnecessary gear changing. Also, the acceleration response can be improved.

Conversely, when the gear ratio of the gear that is set using the current accelerator pedal position and the current drive force is equal to or larger than the gear ratio of the gear that is set using the future accelerator pedal position and the future drive force (NO in S200), automatic transmission 3000 is controlled to implement the gear ratio that is set using the current accelerator pedal position and the current drive force (S204).

According to the control device of this embodiment, as described above, when the gear ratio of the gear that is set using the current accelerator pedal position and the current drive force is smaller than the gear ratio of the gear that is set using the future accelerator pedal position and the future drive force, the automatic transmission is controlled to implement the gear that is set using the future accelerator pedal position and the future drive force. Thereby, when it is expected that a large gear ratio will be required in the future, the state in which the gear ratio is large can be maintained. Therefore, the number of times of unnecessary gear changing can be reduced. Also, the acceleration response can be improved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A gear shift system for a vehicle comprising:
   an automatic transmission; and
   a control unit, wherein
   said control unit detects first information representing a driver's operation,
   detects second information representing running environment of said vehicle,
   sets a first parameter having an accelerator pedal position and a drive force as components according to said first information,
   sets a second parameter having the same types of components as said first parameter according to said second information,
   sets a third parameter having the same types of components as said first and second parameters according to said first and second parameters,
   sets a gear ratio according to said third parameter, wherein the gear ratio is set using a shift map that shows a relationship between a gear ratio and an accelerator pedal position and a drive force, and
   controls said automatic transmission to shift a gear according to said set gear ratio.

2. The gear shift system for the vehicle according to claim 1, wherein
   each of the components of said third parameter is a sum of the respective components of said first and second parameters.

3. The gear shift system for the vehicle according to claim 1, wherein
   each of the components of said third parameter is a maximum value of the respective components of said first and second parameters.

4. The gear shift system for the vehicle according to claim 1, wherein
   each of the components of said third parameter is a minimum value of the respective components of said first and second parameters.

5. A control method for an automatic transmission mounted on a vehicle, comprising the steps of:
   detecting first information representing a driver's operation;
   detecting second information representing running environment of said vehicle;
   setting a first parameter having an accelerator pedal position and a drive force as components according to said first information;
   setting a second parameter having the same types of components as said first parameter according to said second information;
   setting a third parameter having the same types of components as said first and second parameters according to said first and second parameters,
   setting a gear ratio according to said third parameter, wherein the gear ratio is set using a shift map that shows a relationship between a gear ratio and an accelerator pedal position and a drive force, and controlling said automatic transmission to shift a gear according to said set gear ratio.

6. The control method for the automatic transmission according to claim 5, wherein the components of said third parameter are sums of the respective components of said first and second parameters.

7. The control method for the automatic transmission according to claim 5, wherein the components of said third parameter are maximum values of the respective components of said first and second parameters.

8. The control method for the automatic transmission according to claim 5, wherein the components of said third parameter are minimum values of the respective components of said first and second parameters.

9. The control method for the automatic transmission according to claim 5, wherein the parameter is a vector.

10. A control device for an automatic transmission mounted on a vehicle, comprising:

means for detecting first information representing a driver's operation;

means for detecting second information representing running environment of said vehicle;

means for setting a first parameter having an accelerator pedal position and a drive force as components according to said first information;

means for setting a second parameter having the same types of components as said first parameter according to said second information;

means for setting a third parameter having the same types of components as said first and second parameters according to said first and second parameters;

means for setting a gear ratio according to said third parameter, wherein the gear ratio is set using a shift map that shows a relationship between a gear ratio and an accelerator pedal position and a drive force; and means for controlling said automatic transmission to shift a gear according to said set gear ratio.

11. The control device for the automatic transmission according to claim 10, wherein each of the components of said third parameter is a sum of the respective components of said first and second parameters.

12. The control device for the automatic transmission according to claim 10, wherein each of the components of said third parameter is a maximum value of the respective components of said first and second parameters.

13. The control device for the automatic transmission according to claim 10, wherein each of the components for said third parameter is a minimum value of the respective components of said first and second parameters.

14. The control device for the automatic transmission according to claim 10, wherein the parameter is a vector.

15. A gear shift system for a vehicle comprising:
an automatic transmission; and
a control unit, wherein said control unit detects first information representing a driver's operation, detects second information representing running environment of said vehicle, sets a first parameter having a throttle position and a drive force as components according to said first information, sets a second parameter having the same types of components as said first parameter according to said second information, sets a third parameter having the same types of components as said first and second parameters according to said first and second parameters, sets a gear ratio according to said third parameter, wherein the gear ratio is set using a shift map that shows a relationship between a gear ratio and an accelerator pedal position and a drive force, and controls said automatic transmission to shift a gear according to said set gear ratio.

16. A control method for an automatic transmission mounted on a vehicle, comprising the steps of:

detecting first information representing a driver's operation;

detecting second information representing running environment of said vehicle;

setting a first parameter having a throttle position and a drive force as components according to said first information;

setting a second parameter having the same types of components as said first parameter according to said second information;

setting a third parameter having the same types of components as said first and second parameters according to said first and second parameters, setting a gear ratio according to said third parameter, wherein the gear ratio is set using a shift map that shows a relationship between a gear ratio and an accelerator pedal position and a drive force, and controlling said automatic transmission to shift a gear according to said set gear ratio.

17. A control device for an automatic transmission mounted on a vehicle, comprising:

means for detecting first information representing a driver's operation;

means for detecting second information representing running environment of said vehicle;

means for setting a first parameter having a throttle position and a drive force as components according to said first information;

means for setting second parameter having the same types of components as said first parameter according to said second information;

means for setting a third parameter having the same types of components as said first and second parameters according to said first and second parameters;

means for setting a gear ratio according to said third parameter, wherein the gear ratio is set using a shift map that shows a relationship between a gear ratio and an accelerator pedal position and a drive force; and means for controlling said automatic transmission to shift a gear according to said set gear ratio.

* * * * *